United States Patent
Gehman

[15] 3,706,982
[45] Dec. 19, 1972

[54] INTRUSION DETECTION SYSTEM

[72] Inventor: John B. Gehman, San Diego County, Calif.

[73] Assignee: General Dynamics Corporation

[22] Filed: July 1, 1968

[21] Appl. No.: 742,970

[52] U.S. Cl. ............................................340/258 C
[51] Int. Cl. .............................................G08b 13/26
[58] Field of Search ..................................340/258 C

[56] References Cited

UNITED STATES PATENTS

| | | | |
|---|---|---|---|
| 3,510,677 | 5/1970 | Lister | 340/258 C |
| 3,623,063 | 11/1971 | Fontaine | 340/258 C |
| 3,611,345 | 10/1971 | Pintell | 340/258 C |
| 3,571,666 | 3/1971 | McGuirk | 340/258 C |

*Primary Examiner*—Benjamin A. Borchelt
*Assistant Examiner*—H. A. Birmiel
*Attorney*—Martin Lu Kacher

[57] ABSTRACT

An electromagnetic intrusion system is disclosed wherein a sensor having single antenna radiates a sensing field when driven by two independent oscillators having frequencies offset from each other. The oscillators are closely coupled to the antenna and are effected by changes in antenna impedance as results when an object enters the sensing field so that their frequencies deviate. The response of the driving signals from each oscillator and the frequencies thereof are adjusted so that the frequency deviation or pulling of each of the oscillators is out of phase with respect to the other at the selected maximum range, whereas the frequency deviation and therefore sensitivity is dimished in the immediate vicinity of the antenna. The difference frequency is applied to a detection circuit which produces an output in the event of a shift in the differential frequency. The latter circuitry may include a local oscillator, the output of which is mixed with the frequency difference output in two channels. The output of the mixer in one channel is shifted in phase with respect to the output of the mixer in the other channel by 90° at the mixed frequency. A sampling phase detector compares the two channel frequencies and produces an error voltage which varies in polarity depending upon whether the differential frequency is lower or higher than the local oscillator frequency. This error voltage may be used to vary the local oscillator so that no error voltage is produced in the event that an object does not enter the sensing field. Upon entry of an object the error, voltage may be utilized to modulate a transmitter in accordance with a predetermined code representing the sensor. This transmitter may utilize the same antenna, as does the sensor, to transmit a coded signal to a receiving station at which it is demodulated to indicate the particular sensor, out of many, which has detected an object. Inasmuch as each sensor has a separate code, a single receiving channel at a station remote from the sensors may be used to monitor several sensors.

11 Claims, 5 Drawing Figures

INVENTOR.
JOHN B. GEHMAN

INVENTOR.
JOHN B. GEHMAN

INTRUSION DETECTION SYSTEM

The present invention relates to electromagnetic intrusion detection systems and particularly to an intrusion detection system which is adapted to be automatically monitored at a remote station.

While the invention is especially suitable for use in intrusion detection systems to provide security coverage over an area so as to determine direction of travel and speed of objects such as presonnel and vehicles within the area as well as their presence therein, it is also suitable for use in other systems for monitoring indicating or displaying phase or frequency shift information.

In the various types of electromagnetic systems which have been previously suggested, certain disadvantages have been particularly apparent. Specifically, false alarms have been frequency due to environmental affects and motion induced, say by the wind, of an antenna or of nearby bushes, trees and the like. Sensitivity has also been a function of distance from the antenna and increases as the antenna is approached so that a small object, say an animal, such as a dog or cat passing near the antenna, may produce an indication which can be mistaken as a person or vehicle at a distance near the perimeter of the range of the device. Remote control or monitoring has been difficult, particularly when more than a single sensor was desired. The prior systems are also not self detecting. Interpretation of an output signal has been necessary in order to discriminate against noise or other spurious effects.

Accordingly, it is an object of the present invention to provide an improved intrusion system of the electromagnetic type wherein the foregoing difficulties and disadvantages are substantially eliminated.

It is a still further object of the present invention to provide an improved electromagnetic object detection system which is operative with substantially uniformed sensitivity over a long range or a wide sensing area, such as an area having a diameter of from 100 feet to 400 feet, with a single sensor.

It is a still further object of the present invention to provide an improved electromagnetic intrusion detection system which provides information as to the direction and speed of motion of an intruder, either man or vehicle through an area under security coverage.

It is a still further object of the present invention to provide an improved intrusion detection system which requires only a single channel to indicate which of several sensing devices is operated to detect an intruder.

It is a still further object of the present invention to provide an improved electromagnetic intrusion detection system which is automatically corrected for wind sway effects, temperature voltage variations and the effects of moisture in the soil on which it is located, among other effects.

Briefly described an intrusion detection system embodying the invention includes an antenna which is independently excited by two separate oscillators having output frequencies which are offset from each other. These oscillators are closely coupled to the antenna through networks which adjust the phase response of the antenna by changing the relative delay of the signals between the output of each oscillator and the antenna such that a differential frequency shifts or a variable beat is produced when an intruder perturbs the sensing field. Because of the phase response of the adjusting networks, the variable beat is diminished in deviation close to the antenna, thereby making the sensor insensitive to environmental effects and false alarms due to wind motion. When an object enters the sensing field and approaches the antenna at the selected maximum range, the difference frequency shifts cyclically since the exciting oscillators are pulled in opposite directions during each standing wave cycle. Information as to the intrusion of an object is obtained by means of a primary processor and a secondary processor. The primary processor includes a variable frequency local oscillator having a frequency approximately equal to the nominal differential frequency. The output of the oscillator and the differential frequency output are translated to produce channel outputs which are in quadrature with each other. The latter outputs are applied to a correlator for producing an error signal in accordance with the frequency difference therebetween for varying the local oscillator frequency. One of the channel outputs may however by applied to a utilization device which produces an audio tone having a cyclical frequency variation which is a function of the size and rate of movement of an intruding object through the sensing field of the antenna. The second processor is responsive to one of the channel outputs and includes means for detecting when the differential frequency exceeds a predetermined threshold. Means are also included for detecting the cyclical variation of the differential frequency signal. When a predetermined number of cyclical variations and the threshold are exceeded an output signal representing an alarm is produced. This signal may be applied to modulate an oscillator which transmits a signal through the sensor antenna on a certain frequency which is coded to designated detection of an intruding object by the particular sensor. Since a particular code is representative of an individual sensing device a receiver responsive to the modulating signal is provided. This receiver may include a display for indicating which sensor is activated.

The invention itself, both as to its organization and method of operation, as well as additional objects and advantages thereof will become more readily apparent from a reading of the following description in connection with the accompanying drawings in which.

Figure 1:
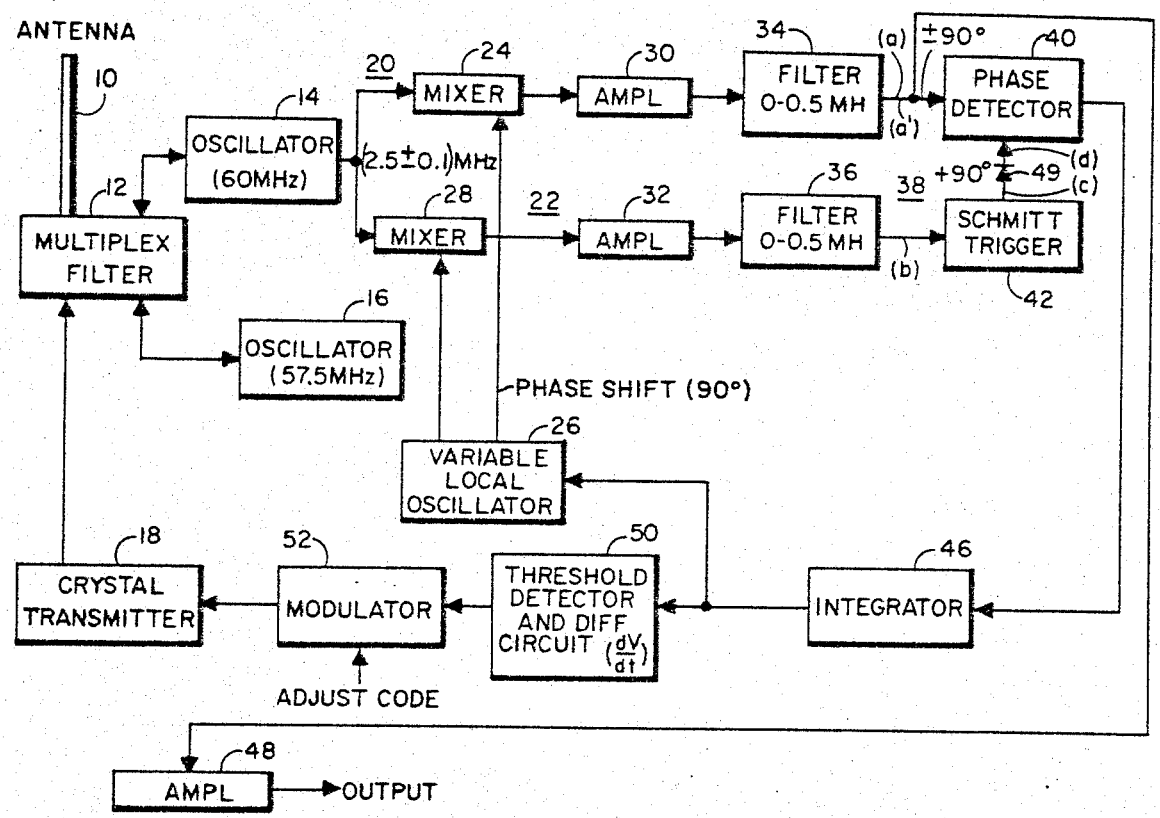
FIG. 1 is a block diagram of an intrusion detection system embodying the invention.

Referring first to FIG. 1, there is shown an antenna 10 which may be a monopole, whip type antenna supported on a stake above the ground. This antenna may be camouflaged so as to be unobtrusive to any intruder who may wish to penetrate the secured area. The antenna is coupled to a multiplex filter 12 which may comprise three coupling circuits, two of which are traps which preclude cross coupling. A pair of wave generating means in the form of oscillators 14 and 16 which may be of the Colpitts type are connected via trap circuits in the multiplex filter to the antenna 10. The trap circuits are designed such that the signals may pass between the oscillators such that a frequency differential signal may be derived across a portion of one of the oscillator circuits, say the resistor capacitor biasing circuit which is connected between the base and emitter of a transistor therein. The oscillators nominally provide waves at frequencies in the VHF band which are offset from each other by 5 to 10 percent. In the instant case the oscillator 14 produces 60 MHz waves while the oscillator 16 produces 57.5 MHz waves. A transmitter 18 which may be a crystal controlled oscillator is coupled through a trap in the multiplex filter 12 to the antenna so as to be able to radiate signals at a frequency removed from the oscillator frequencies, say 20 MHz.

The frequency differential signal which is derived from the oscillators will, in the illustrated case, be 2.5 MHz. This signal may deviate in frequency by as much as 0.1 MHz as an intruder enters the sensing field and stands by radiating antenna. In order to make the oscillators more sensitive to objects in the sensing field, it is desirable to effectively couple the antenna across one of the capacitors in the tank circuit of the oscillators which is larger value of capacitance, say twice the value of capacitance of the other capacitor. The frequencies of the oscillators are also chosen such that the radiated standing waves will be 180° out of phase in the vicinity of the selected maximum target range desired to be detected. The coupling circuits also desirably adjust the phase of the standing waves so that they are in phase and track each other close to the antenna. As an intruder enters the sensing field the frequency of each oscillator is in an opposite sense pulled and causes the difference frequency to vary. The deviation in frequency varies cyclically as the intruder approaches the antenna. Also the magnitude of the deviation is a function of the size and range of the object detected. Inasmuch as the standing waves generated by the oscillators are in phase in the immediate vicinity of the antenna, the frequency differential signal (viz. the algebraic difference between the oscillator frequencies) resulting from objects in the immediate vicinity of the antenna, say within one wavelength of the generated standing wave from the antenna is reduced by an order of magnitude. Accordingly, environmental effects and wind sway effects both of the antenna and on objects, such as trees, in its immediate vicinity reduce false alarm signals. By observing the frequency differential signal, information as to the presence of an intruding object as well as the speed and direction of motion of the object can be acquired. Processing circuitry for acquiring the foregoing information and precluding false alarms is provided in accordance with the invention.

Figure 5:
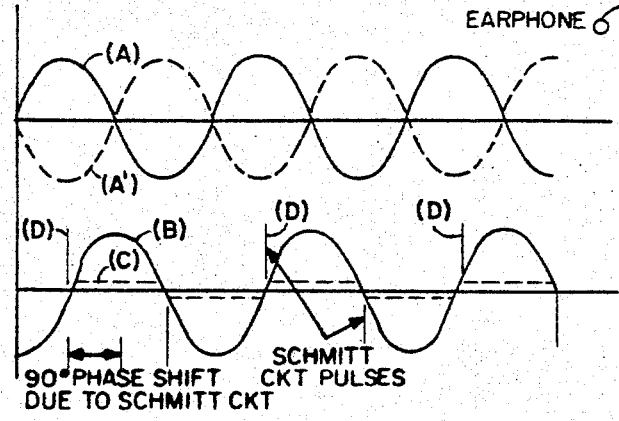
FIG. 5 is a waveform diagram showing in idealized form, the waveforms at the outputs of the different ones of the channel mixers as well as other components of the system shown in FIG. 1 during various conditions of operation thereof.

This circuitry includes a first channel 20 and a second channel 22 which are responsive to the frequency differential signal. Each of these channels is a frequency translating channel. The first channel 20 includes a mixer 24 which receives a signal from a variable local oscillator 26. The second frequency translation channel includes another mixer 28 which receives a similar signal from the local oscillator 26. The local oscillator signal applied to the first channel mixer 24 is shifted in phase 90° with respect to the signal applied to the second channel mixer 28. The frequency of this local oscillator is equal to the nominal frequency of the frequency differential signal, in this case 2.5 MHz. The mixer product will then be zero beat signal when the frequency differential signal does not deviate in frequency, or a signal which may be of a frequency as high as the largest frequency deviation, say 0.1 MHz. In order to pass the signal, the mixer outputs are amplified in amplifiers 30 and 32 and then pass through low pass filters 34 and 36. The output of the second channel filter is shown in waveform B of FIG. 5. This signal is used as a reference in the phase detection circuit 38. The phase detection circuit includes a phase detector 40 of the boxcar type (viz. a sample and hold detector) and a schmidt trigger 42. The bandpass of the filters may be DC to 0.5 MHz in order to pass the entire range of deviation of the frequency differential signal as translated by the mixers 24 and 28.

The first channel output which results from the mixing of the quadrature phase signal and the frequency differential signal in the mixer 24 will lead the reference signal from the output of the filter 34 when the frequency differential signal is of a lower frequency than the variable local oscillator signal. On the other hand if the frequency differential signal is of a higher frequency than the local oscillator signal it will lag the second channel output signal or reference by 90°. The leading phase relationship is shown by the dash line waveform A' in FIG. 5 while the lagging phase relationship is shown by the solid line waveform A in FIG. 5. It will be observed from FIG. 5 that if the reference signal B were shifted an additional 90° with respect to the signals A and A' and the phase of the two signals were compared, a phase detector output would be of one polarity (positive) if the differential frequency signal were lower in frequency than the variable local oscillator signal and of the opposite polarity (negative) if the frequency differential signal A were higher in frequency than the local oscillator signal. In order to shift the frequency of the reference output from the filter 36 (waveform B) by 90° in phase over the entire frequency range (viz. DC to 0.1 MHz), a Schmidt trigger circuit is used to produce a square wave from the reference B. The waveform of the Schmidt trigger output is shown in waveform C. The leading edge of this waveform is 90° out of phase with respect to its own waveform B. A differentiating circuit is utilized to obtain pulses at the leading and lagging edges of waveform C. (This differentiating circuit is not shown to simplify the illustration.) Only the positive going pulses (d) are required and the negative going ones are suppressed by means of a diode 40. These positive going pulses then strobe the boxcar phase detector 40 which, functioning as a sample and hold circuit, will provide a direct current level having a magnitude and polarity which is a function of the frequency differences between the local oscillator signal and the frequency differential signal. The phase detector output voltage is integrated in an integrating circuit 46 to produce an error voltage which is applied to the local oscillator 26 in order to reduce the difference between the differential frequency signal and the variable local oscillator to a zero beat condition. The time constant of the integrating circuit can be made relatively long in order to permit a beat note to be monitored at the output of the first channel filter 34. Of course, the output of the integrating circuit itself will be a voltage proportionally to the frequency deviation of the frequency differential signal if the time constant of the integrator is relatively short.

In the illustrated system an output is taken from the first channel filter 34. This output may be amplified in an amplifier 48 which is connected by way of a wire line to a receiver at a remote monitoring point. The amplified signal may be translated into an audible tone by means of an electrodynamic transducer, such as a speaker or head set and used by an operator to detect the intrusion of an object, the speed of the object or the characteristics of the object depending upon the amplitude of the frequency deviation and its repetition rate.

In accordance with the invention, the beat note signal need not necessarily be used as an audible output. Rather the crystal controlled transmitter 18 may be used to radiate a signal to a remote monitoring receiver which will indicate that the sensor has detected an object. To this end a threshold detector and differentiating circuit 50 may be connected to the output of the integrator so as to be responsive to the error voltage. When the error voltage changes and exceeds a magnitude greater than a predetermined threshold, which is set in order to prevent false alarms due to noise or other spurious effects, the threshold detector-differentiating circuit 50 will produce an output pulse. This pulse may be stretched for a short period of time by means of a one-shot multi-vibrator or similar circuit (not shown). The pulse is applied to a modulator. This modulator may be a multi-vibrator which is adapted to produce a modulating signal or a series of modulating tones having frequencies which will characterize the sensor unit and distinguish it from other sensor units in the vicinity. The modulating signal is applied to the crystal transmitter which produces a modulated signal and transmits it by way of the antenna 10. Inasmuch as a number of different sensor units have different frequencies or codes, several of such units may share the same radio channel and a single receiver may respond thereto and indicate when a particular one of the sensing units detects an object. A more detailed description of such a receiver will be given hereinafter in connection with FIG. 5.

Figure 2:
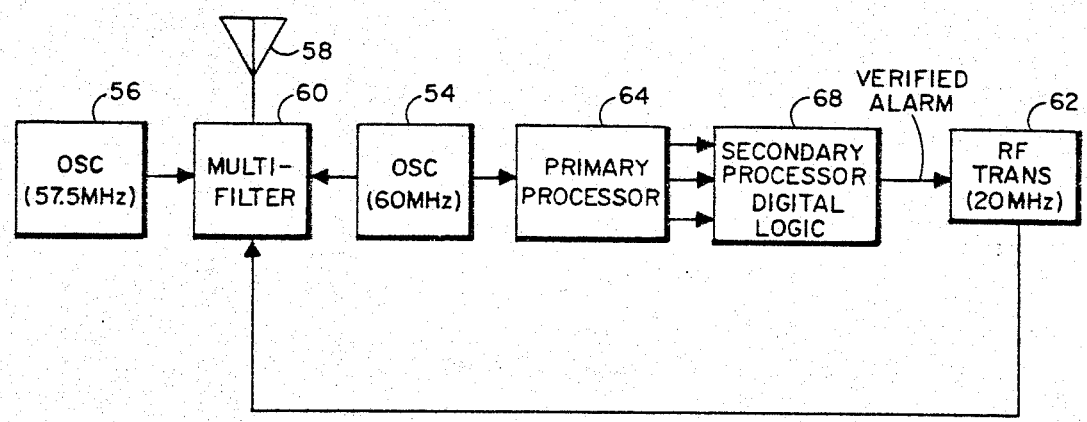
FIG. 2 is a block diagram of an intrusion detection system in accordance with another embodiment of the invention.

Referring to FIG. 2, there is shown first and second oscillators 54 and 56 which may be coupled to the antenna 58 by way of a multiplex filter 60. The antenna 58 may be similar to the antenna 10 while the oscillators 54 and 56 are similar to the oscillators 14 and 16 discussed in FIG. 1. A radio frequency transmitter 62 which produces a modulated signal at a frequency removed from the sensor oscillators frequencies, say 20 MHz is also coupled to the antenna through the mulitplex filter as was the case for the crystal transmitter 18 shown in FIG. 1. The differential frequency signal which may be derived from the higher frequency oscillator 54 is applied to a primary processor 64, which may be similar to the system shown in FIG. 1, for deriving the error voltage and controlling the variable local oscillator. Three outputs are derived from this primary processor and applied to a secondary processor 68. The secondary processor has for its purpose the self-detection of an intruder which enters the sensing field of the antenna 58. The secondary processor also verifies that an output representing a true intruder or intruders is being produced by the primary processor and produces a verified alarm which may be used to activate the RF transmitter 62 so as to transmit to the monitoring station information respecting the detection of an intruder at or by a particular one of several sensors. Briefly, the secondary processor includes digital logic which analyzes the output signals from the primary processor to insure that these signals represent more than spurious effects. The secondary processor or digital logic further insures that an object or an intruder is detected notwithstanding that he may traverse the sensing field in any of several possible ways.

Figure 3:
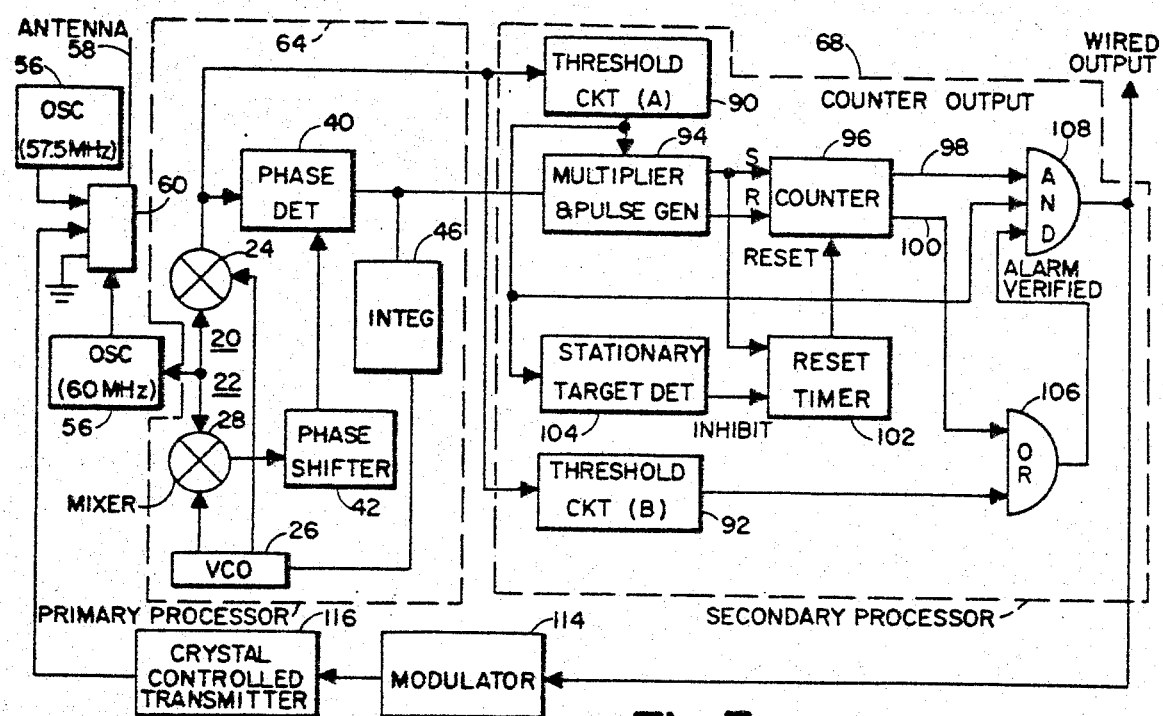
FIG. 3 is a block diagram of the primary and secondary processor of the system shown in FIG. 2.

FIG. 3 shows in greater detail the primary processor 64 and the secondary processor 68. Also shown is the antenna 58, the oscillators 54 and 56, and filter 60. The primary processor may be similar to the system shown in FIG. 1. Accordingly like parts of both systems are identified by like numerals. An understanding of the primary processor may be had by reviewing the discussion of FIG. 1. The primary processor in FIG. 3 has, of course, been simplified in order to facilitate the illustration.

Three outputs are taken from the primary processor. Two of these are identical and represent the beat note signal at the output of the first channel 20. An intruder causes this output to be frequency modulated as he moves towards the antenna 58. Frequency deviation or modulating above a predetermined threshold, referred to hereinafter for the sake of convenience as a first threshold, may be used to discriminate against frequency deviation due to the noise in the environment and actual intruder produced deviations. A second threshold level of frequency deviation, which is considerably above the noise level, can be taken with a high degree of confidence as evidence of an intruder. The secondary processor includes two threshold circuits 90 and 92 which provide output levels when the first threshold and second threshold respectively are exceeded. These threshold circuits 90 and 92 may include frequency discriminators and a Schmidt trigger circuit which will continue to provide voltage level so long as the as the threshold is exceeded.

Another output taken from the primary processor is at the output of the boxcar detector. It will be recalled from a discussion of the boxcar detector 40 that it will produce voltages of opposite polarity when the differential frequency signal is lower or higher than the local oscillator signal respectively. Thus as the intruder approaches the antenna, the polarity of the boxcar detector output changes each time he traverses a distance equal to a half cycle of the standing wave wavelength of the transmitted energy. The duration of each of these cycles or lobes of the phase detector output is a function of the path through the sensing field which the intruder takes. If the intruder travels along a radial path towards the antenna, the cycles will be closer together. However, the cycles nevertheless occur even though the intruder follows a path spaced at all times from the antenna. In every case an intruder will produce at least one cycle (viz. a positive and negative output from the detector) as he traverses the sensing field.

The boxcar detector output is applied to a multiplier and pulse generator circuit 94. The purpose of the multiplier is to identify high (+) and low (−) beat frequencies. The multiplier may be a gate which is inhibited by the output of the first threshold circuit 90 so that cycles are not counted if the noise threshold is not exceeded. The pulse generator shapes the pulses to produce a short positive pulse on one line and then on another line as the boxcar detector output goes positive and negative respectively. These lines may be the set and reset inputs of a counter 96. A first output level is produced by the counter on an output line 98, when a set and reset pulse representing a single cycle of frequency deviation is registered and the second output level is produced by the counter 96 on another output line 100 when two complete cycles, that is four set and reset pulses in a sequence where a reset pulse follows a set pulse, are counted and registered in the counter 96.

The counter may be reset by a reset pulse which is produced by a reset timer circuit 102 such as a one-shot multi-vibrator. The reset timer circuit is activated when a set pulse is produced and resets the counter to a zero count a predetermined time, say 7 seconds, after any set pulse. This a spurious signal which may cause a single pulse to appear will not affect the output if a subsequent pulse does not appear within 7 seconds. In order to preclude the possible loss of a stationary object such as an intruder who enter the sensing field and stops, a stationary target detector 104 is provided which inhibits the reset timer from resetting the counter for a predetermined time say 6 seconds after the end of an output from the first threshold circuit. The stationary target detector may be a one-shot multi-vibrator which is triggered by the trailing edge (viz. the negative going edge) of the output level from the first threshold circuit 90.

A pair of gates 106 and 108 cooperate to produce a verified alarm signal when the counter and the threshold circuit provide outputs indicative of the presence of an intruder. The gate 108 is an AND gate which provides outputs under two conditions; first, when the first threshold circuit 90 produces an output; at least one cycle is registered in the counter and an output is produced on line 98 and the second threshold circuit also provides an output. This allows for the non-ideal intruder who does not charge straight through the sensing field but who may stop, pause and again move through the field or just a small portion thereof. The AND gate 108 also produces an alarm verified output when the first threshold circuit 90 again produces an output, and two complete cycles are counted. This time the second threshold need not be exceeded. This output is produced both when an intruder moves straight through the sensing field and also when he meanders through the field but is too small or protected to exceed the second threshold built into the threshold circuit 92.

The alarm verified output may be connected by a wire line to the receiving point or it may be applied to a modulator 114 and a crystal controlled transmitter 116 similar to the modulator 52 and transmitter 18 described in connection with FIG. 1. The transmitter 18 then produces a coded signal which is transmitted by way of the antenna to a remote receiver.

Figure 4:
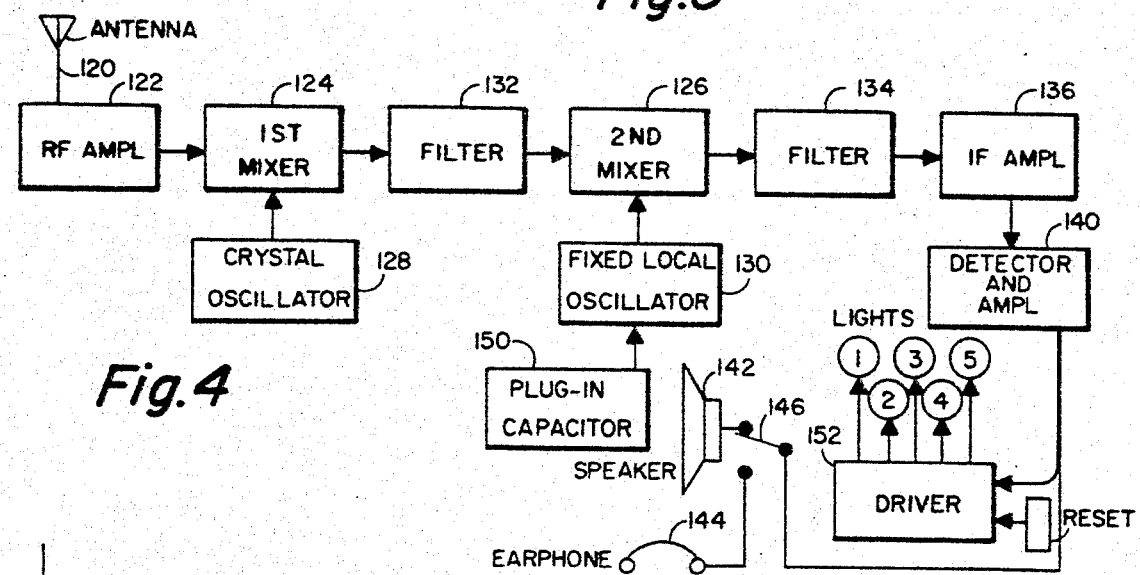
FIG. 4 is a block diagram of a receiver which may be associated with the system shown in FIG. 2.

FIG. 4 shows such a remote receiver which may be suitable for use in an intrusion detection system provided in accordance with the invention. The receiver includes an antenna 120 and an RF amplifier 122. A first mixer 124 and a second mixer 126 are also provided. These mixers, together with a crystal oscillator 120 which provides a local injection signal to the first mixer and a local oscillator 130 which provides a second injection signal to the second mixer, perform a double conversion superheretodyne function. The receiver may be used to detect the differential frequency signal beat from the processor mixers or the signal which is at a much higher frequency and is transmitted by the crystal control transmitter 116 shown in FIG. 3. In the event that the differential frequency signal is to be detected directly, it is desirable that the first injection frequency be selected to produce an intermediate frequency passed by a filter 132, which includes the frequency deviation. The second injection frequency from the local oscillator 130 is then selected to be equal to provide the second intermediate frequency so that the output of the second mixer contains solely the frequency deviation. This second output frequency may then be filtered in a filter 134 and amplified in an intermediate frequency amplifier 136. A detector 140 such as an FM discriminator then produces an audio tone corresponding to the frequency deviation which may be applied to a speaker 142 or earphone 144 selectively by way of a switch 146. In the event that the crystal controlled transmitter signal is received, it is desirable to provide as the second IF signal on that signal which is modulating the transmitter. It will be recalled that the same radio channel (viz. crystal controlled transmitter frequency) may be used for a large number of sensor units. The difference between the sensor units is characterized by the modulating signal frequency. The fixed local oscillator 130 may have a plug-in capacitor 150 which will shift the injection signal frequency such that only a predetermined band of modulating signals, say as may be derived from five different sensor units, is passed as the second IF signal. The detector 140 may include reeds tuned to different ones of the modulating signals. Amplifiers individual to each of the reeds are connected to driver circuits 152 which drive individual lights or lamps each for a different one of the frequencies. Thus by changing the plug-in capacitor 150, different groups of sensor units may be monitored merely by viewing the lamps and observing which one or ones thereof are illuminated.

From the foregoing description it will be apparent that there has been provided an improved intrusion detection system which is self-detecting and automatically detects and indicates which of a plurality of sensor units detect an intruder in its sensing field. By virtue of the fact that differential frequency signals are used and the frequency deviation thereof is derived by means of phase detection techniques, the system is relatively insensitive to environment effects such as temperature, wind motion and the like. While an illustrative embodiment of the system has been described, it will be appreciated that variations and modifications thereof will become apparent to those skilled in the art. Accordingly the foregoing description should be taken merely as illustrative and not in any limiting sense.

What is claimed is:

1. A sensor system comprising
   a. an antenna for radiating a sensing field, b. first and second means for generating electromagnetic waves independently coupled to said antenna, the frequency of the waves generated by said first means being offset from the frequency of the waves generated by said second means, to provide a signal having a frequency equal to the frequency differential between the frequencies of said waves which deviates when an object enters said field, c. a source of signals having a frequency about equal to said offset and variable in frequency, d. a first and second frequency translation channel for respectively providing outputs corresponding to the products of (i) said frequency difference signal and said source signal and (ii) said frequency differential signal and said source signal shifted in phase with respect to said source signal, e. means responsive to the phase difference between said outputs for providing an error signal, f. means for varying the frequency of said source in accordance with said error signal in a sense to reduce said error signal, and g. means responsive to the frequency deviation of the output from one of said channels for providing a signal representing the absence or presence of said object in said field.

2. A sensor system comprising a. an antenna for radiating a sensing field, b. first and second means for generating electromagnetic waves independently coupled to said antenna, the frequency of the waves generated by said first means being offset from the frequency of the waves generated by said second means, to provide a signal having a frequency equal to the frequency differential between the frequencies of said waves which deviates when an object enters said field, c. a source of signals having a frequency about equal to said offset and variable in frequency, d. a first and second frequency translation channel for respectively providing outputs corresponding to the products of (i) said frequency differential signal and said source signal and (ii) said frequency differential signal and said source signal shifted in phase with respect to said source signal, e. means responsive to the phase difference between said outputs for providing an error signal, f. means for varying the frequency of said source in accordance with said error signal in a sense to reduce said error signal, g. means coupled to said antenna for applying a signal to said antenna for transmission thereby, and h. means responsive to said error signal for modulating said last named means when said error signal is produced whereby to transmit a signal indicative of the presence of an object in said sensing field.

3. The invention as set forth in claim 2 wherein said generating means are oscillators each coupled to said antenna and via said antenna to each other, and wherein the input to said channels is connected to at least one of said oscillators to derive said differential frequency signal therefrom, said channels including separate mixers, and means for applying said source signals to said mixer in said first channel and said source signal shifted in phase by about 90° to said mixer in said second channel.

4. The invention as set forth in claim 3 wherein said phase responsive means includes means responsive to said first channel output for providing pulses at one of said crossovers thereof, and a sample and hold circuit to which said second channel output is applied as one input and said pulses as sampling pulses, and integrator means responsive to the output of said sample and hold circuit for providing said error signal.

5. The invention as set forth in claim 4 wherein said error signal responsive means includes means for providing an output when the magnitude of said error signal exceeds a predetermined threshold, and a modulating circuit operated by the output of said last-named means for applying a modulating signal having a predetermined characteristic to said transmission means.

6. The invention as set forth in claim 5 wherein said system includes a plurality of sensors each including an antenna and the system elements, as set forth in claim 5, and wherein the modulating circuits associated with different ones of said antennas includes means for generating different modulating signals each coded to represent its associated sensor.

7. A sensor system comprising a. an antenna for radiating a sensing field, b. first and second means for generating electromagnetic waves at frequencies offset from each other separately coupled to said antenna, c. a primary processor responsive to a signal having a frequency equal to the differential frequency between the waves radiated by said antenna, and d. a secondary processor responsive to said differential frequency signal for providing an output when the frequency deviation of said signal exceeds a predetermined threshold and said frequency differential varies cyclically through at least one cycle for providing an output representing the detection of an object.

8. The invention as set forth in claim 7 further comprising a. a transmitter coupled to said antenna, and b. means responsive to said secondary processor output for modulating said transmitter.

9. The invention as set forth in claim 6 wherein said secondary processor comprises a. means responsive to said differential frequency signals for producing a first output when the frequency deviation of said differential signal exceeds a certain threshold, b. counter means for counting each half cycle of deviation of said differential frequency signal, and c. logic means for providing said object representing output when said counter registers a predetermined count and said first output is produced.

10. The invention as set forth in claim 9 including a. means responsive to said differential frequency signal for producing a second output when said differential frequency signal has a frequency deviation exceeding a predetermined threshold lower than said certain threshold, b. means for inhibiting said counter means from counting in the absence of said second output, c. means for resetting said counter a predetermined time period after each of said half cycles is counted, d. means for inhibiting said resetting means for a certain time after the end of said second output, and
e. logic means for providing said object representing output when a second predetermined count greater than said first mentioned count is registered in said counter and said second output is produced.

11. The invention as set forth in claim 2 wherein said modulating means includes a source of signal having predetermined frequency and wherein said system includes a double conversion superheterodyne receiver for receiving the signal transmitted by said transmitting means, said receiving having first and second sources of injection signals, means for mixing the first injection signal with the received transmitted signal to produce a first signal which is the sum of a first intermediate frequency and said predetermined frequency of said source, said second injection signal having a frequency equal to said first intermediate frequency, means for mixing said second injection signal and said first signal to produce a second intermediate frequency signal corresponding to said source signal, and means responsive to said source signal for indicating the detection of an object.

* * * * *